April 2, 1929.   F. W. BENTON   1,707,840
VALVE STEM FOR PNEUMATIC TIRES
Filed Sept. 7, 1927
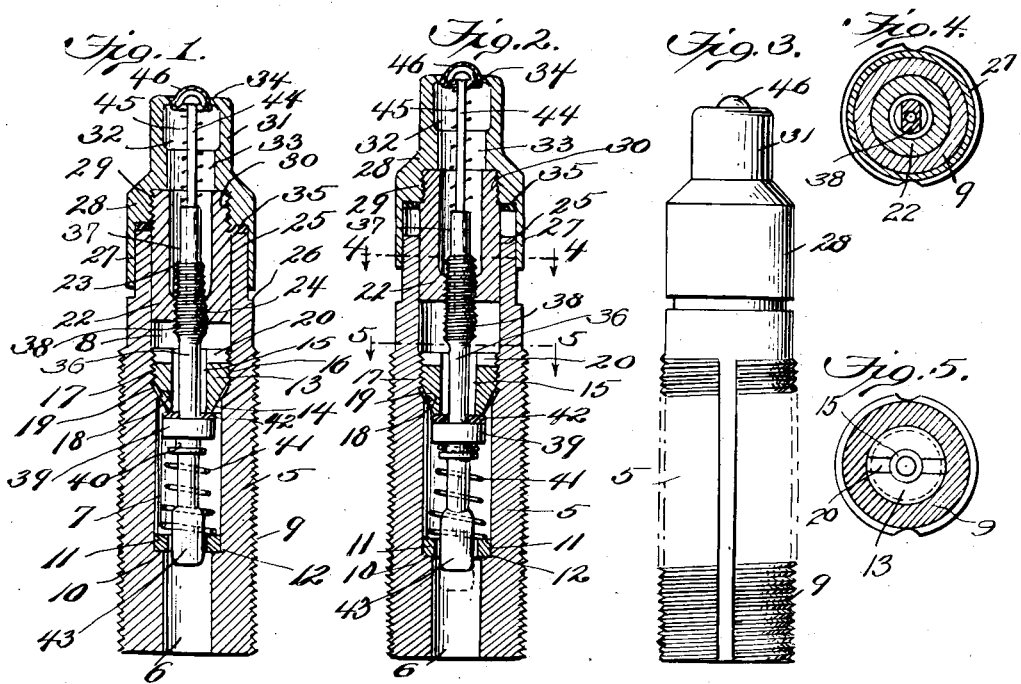
Inventor
Frank W. Benton
By
Attorney Patented Apr. 2, 1929.

1,707,840

UNITED STATES PATENT OFFICE.

FRANK W. BENTON, OF WILSON, NORTH CAROLINA.

VALVE STEM FOR PNEUMATIC TIRES.

Application filed September 7, 1927. Serial No. 217,993.

This invention relates to valves for pneumatic tires, and among the objects thereof are to provide means to prevent the valve stem from rotating, and to provide, at that end of the valve casing through which compressed air is admitted, means which are operable to unseat the valve or to secure the valve against its seat.

A further object of the invention is to provide a valve stem for the purpose set forth so constructed as to exclude dust and dirt therefrom and wherein the operation is positive and certain.

With these and other objects and advantages in view, the invention consists in the construction and arrangement of the several parts which will be more fully hereinafter described and claimed.

In the drawing:—

Fig. 1 is a transverse vertical section of a valve casing and stem embodying the invention.

Fig. 2 is a similar view with parts in different positions, and a dotted line indication showing the operation thereof.

Fig. 3 is a side elevation of the improved valve casing and stem with the parts in position as shown in Fig. 1.

Fig. 4 is a horizontal section on the line 4—4 Fig. 2.

Fig. 5 is a horizontal section on the line 5—5 Fig. 2.

The numeral 5, Figs. 1, 2, 3, 4 and 5, designates a casing having a bore 6 opening through the bottom thereof and into a larger bore 7, the upper part of the larger bore 7 being continued into a chamber 8. The lower exterior portion of the casing 5 is screw-threaded, as at 9, for application to the tire. Between the lower portion of the bore 6, which communicates with the tire and the larger bore 7, a shoulder 10 is formed and thereon is fitted a dog or washer 11 which is of the same diameter as the larger bore 7 and has right angular slots 12 therethrough, as shown by Fig. 10. At the upper end of the larger bore 7 a valve seat 13 is inserted, and is provided with a lower conical extremity 14 and a bore 15 therethrough which communicates with the larger bore 7 and also the chamber 8. The valve seat is exteriorly screw-threaded, as at 16, to engage corresponding threads 17 at the upper end of the larger bore 7, and in a recess 18 at the lower conical extremity 14 of the valve seat is a packing gasket 19 which is inserted to form an air tight joint. At the top of the valve seat 13 is a slotted key head 20 which facilitates placement and removal of the valve seat, and is adapted to receive a key or other device. In the chamber 8 a plug 22 is seated and has a bore 23 therethrough with a lower reduced extremity 24 which is screw-threaded. The lower reduced extremity 24 of the bore 23 extends through the plug 22 and provides means of communication with the lower part of the chamber 8, the bore 15 through the valve seat, the bore 7, and the bore 6 in a manner which will be hereinafter explained. The upper extremity of the casing 9 is reduced in thickness, as at 25, and a shoulder 26 is thus formed to receive the lower edge of the reduced wall 27 of the cap 28 which is internally screw-threaded, as at 29, to engage screw-threads 30 at the upper extremity of the plug 22. This cap has an upper reduced extremity 31 with a chamber 32 therein having a smaller diameter at its lower portion 33, the upper extremity of the cap being reduced and having a top with an inlet opening 34. A gasket 35 is inserted between the upper reduced extremity 25 of the casing and the adjacent portion of the wall of the cap to form a tight joint at this point. The chamber 32 with its diametrical reduced portion 33 communicates with the bore 23 of the plug 22 so that, when the parts are in open position, there will be a through communication between the bore 6 and the chamber 32. Within the casing and extending from the dog or washer 11 to near the top of the plug 22 is a main valve portion 37 formed with an upper tubular stem 36, and a screw-threaded enlargement 38 at the base of the tubular portion 37 to movably engage the lower reduced screw-threaded terminal 34 of the plug 22. The enlargement 38 is flattened at diametrically opposite sides, as shown in Fig. 4, and below the said enlargement 38 the stem is smooth and continues through the bore 15 of the valve seat, the said bore continuing through the key bar 20. The stem 36 is provided with a valve 39 having a lower spring seat or groove 40 to receive the upper end of a convolute spring 41 bearing at its lower and enlarged end on the dog or washer 11. The valve 39 has a washer 42 thereon which is jammed against the lower reduced conical extremity 14 of the valve seat 13, and from the spring terminal seat 40 the stem continues downwardly into a flattened head 43 which loosely extends through one of the cross slots 12 of the dog or washer 11.

In the upper tubular portion 37 of the valve stem 36 an auxiliary valve stem 44 is longitudinally slidable and is surrounded by a spring 45 which has its lower end bearing against the upper terminal of said tubular portion 37 and its upper end bearing against a dome-shaped valve 46 on the upper end of the auxiliary stem 44. The dome shaped valve 46 cooperates with the opening 34 in the top of the upper reduced extremity of the cap 28.

The operation of the valve stem as above disclosed and shown by Figs. 1 to 5 inclusive, is very simple. The valve tube being closed, when the cap 28 is rotated in one direction, the screw-threaded enlargement 38 of the valve stem 36 is drawn upwardly by its screw threaded engagement with the lower reduced threaded portions 24 of the bore 23 of the plug 22. This operation draws the valve 39 with its gasket 42 tightly against the lower conical extremity 14 of the valve seat 13, and the flattened head 43 of the valve stem 36 is drawn upwardly, and the dome shaped valve 46 is forced into and closes the opening 34 in the top of the cap 28 so as to prevent the entrance of dust and grit into said opening the stem 44 being forced downwardly into the tubular portion 37 of the stem 36 against the resistance of the spring 46 bearing against the underside of the said dome shaped valve 46 and the upper terminal of the said tubular portion 37. The gasket 35 at the upper end of the reduced wall 25 of the casing 5, bearing against the shoulder of the cap 28, produces a tight joint at this point that will prevent leakage of air therethrough from the tube. When the cap 28 is screwed down its full limit the valve 39 with its washer 42 is held firmly and positively against the lower conical reduced extremity 14 of the valve seat 13 and the escape of air from the tire is also obstructed at this point. The air is prevented from escaping around the seat 13 by the gasket 19, and a tight jointure throughout the entire valve stem structure is provided, and the dome shaped valve 46 is held by the spring 45 against the opening 34 until the cap 28 is rotated in an opposite direction to release the enlargement 38 of the stem 36 from the threaded reduced portion 24 of the bore 23 of the plug 22. This releases the valve 46 and valve 39 for operation, the plug 22 is drawn upwardly with the cap 28 in view of the tight connection of the threaded jointure 30 between the said parts as shown by Fig. 2, and the auxiliary stem 44 is forced upwardly by the spring 45 above its normal position in the tubular stem 36, so that the dome shaped valve cap 46 is free for depression against the spring 45, and in turn the valve 39 is free to be unseated by compressed air introduced through the openings 34. By this means a through passage is opened throughout the length of the valve stem for unrestricted passage of air therethrough into the tire when the dome shaped valve 46 is pressed inwardly.

The cap 28 is removable, and carries with it the plug 22, valve stem 44 and valve 46 to thus render the remaining parts accessible for removal. When the cap 28 is mounted for operation, one upward loosening turn of the said cap is sufficient to allow the air to be injected into the tire, and one tightening or reverse turn of said cap will close the valve 39 tightly against the seat 13. The harder the downward screwing of the cap 28 the tighter it pulls on the main valve stem 36 carrying the said valve 39 and thereby a perfect seating for the latter valve is provided with material advantages in the operation and effectiveness of the improved device.

It will be obvious that an air hose may be connected in any suitable way with the reduced extremity 31 of the cap 28.

What is claimed as new is:—

1. In a device of the class specified, the combination of a casing, an upper member mounted on the casing, a plug secured to the said upper member, said upper member and plug having openings therethrough, a valve stem separably engaging a portion of the plug, an intermediate valve seat through which the stem movably extends, the valve stem having a valve thereon to engage the said intermediate seat and a flattened head at its lower end, spring means urging said valve toward said intermediate seat, the upper member of the casing being movable vertically on the main casing and carrying the plug therewith, the main casing and upper member having communicating bores and chambers therethrough, a spring actuated auxiliary stem and valve cooperating with the opening in the upper member and slidable in the upper portion of the main valve stem, and a lower slotted dog in which the said head of the valve stem is movably mounted.

2. In a device of the class set forth, a casing having a lower main member, an upper member rotatable and vertically movable on said lower member, a plug connected to the upper movable member and provided with a bore having a lower reduced threaded extremity, an intermediate valve seat carried by said lower member, said upper member, main casing and valve seat having bores therethrough, a valve stem having a threaded portion to engage the lower reduced threaded extremity of the plug bore an intermediate valve carried by said stem to engage the intermediate seat, a vertically movable valve for closing the bore of the upper member and having a stem loosely associated with said first named valve stem, a stem depending from said intermediate valve and having a lower flattened end, spring means urging said upper and intermediate valves toward their seats, and a slotted dog in which the lower flattened head of said depending stem is movably associated.

3. A device of the character specified, comprising a casing having a longitudinal bore and a downwardly facing valve seat in said bore between its opposite ends, a valve in said bore below and movable toward and away from said seat, a stem extending from the upper face of said valve through said valve seat, a stem depending from the lower face of said valve, means adjacent the lower end of said bore and in which said depending stem is longitudinally slidable but restrained against rotation, a longitudinally bored member rotatable on the upper end of said casing and having a downwardly facing valve seat at the upper end of its bore, a longitudinally bored plug depending from said member into the upper end of the bore of the casing, said plug and the upwardly extending stem of said valve having interengaging means operative, when said member is rotated in one direction, to hold said valve against its seat and, when said member is rotated in the opposite direction and depressed, to cause said valve to move away from its seat, and a spring seated valve in the bore of said member below the valve seat of the latter and having a depending stem extending through the bore of said plug in telescopic relation with the upwardly extending stem of said first named valve.

In testimony whereof I have hereunto set my hand.

FRANK W. BENTON.